UNITED STATES PATENT OFFICE.

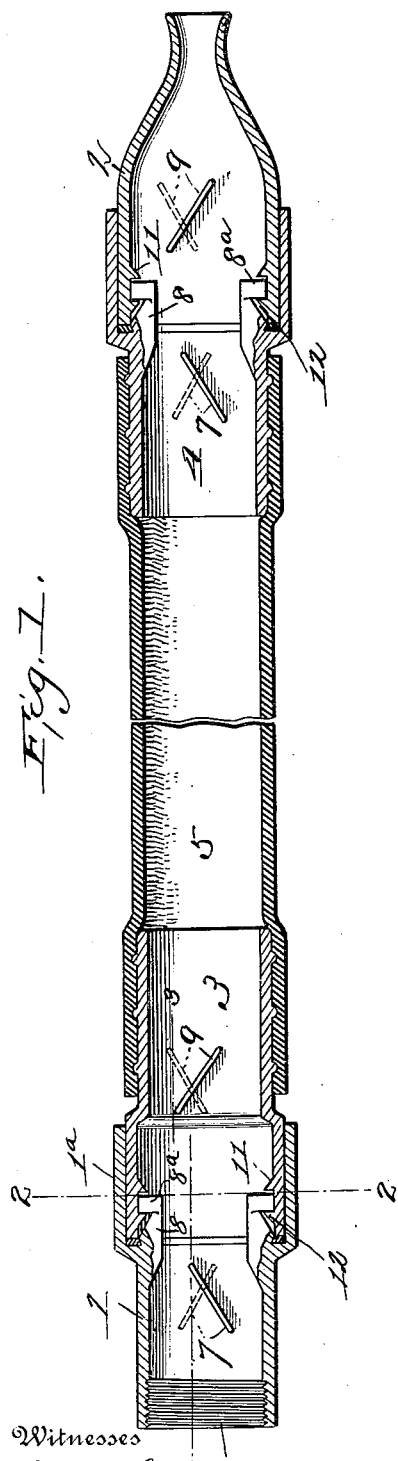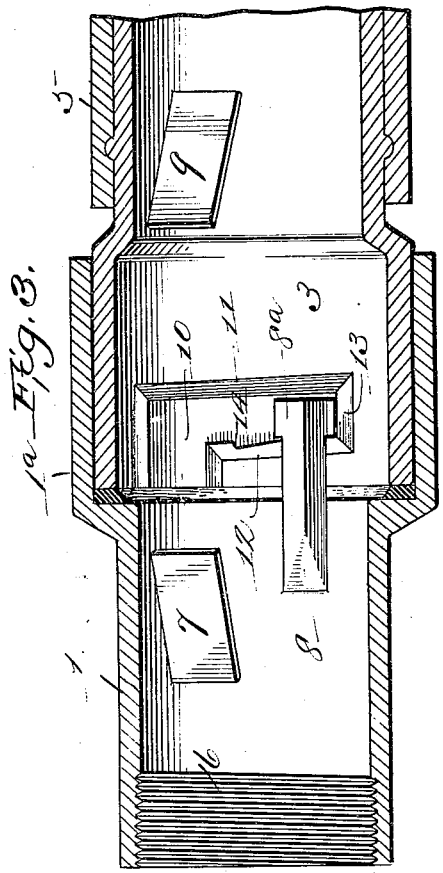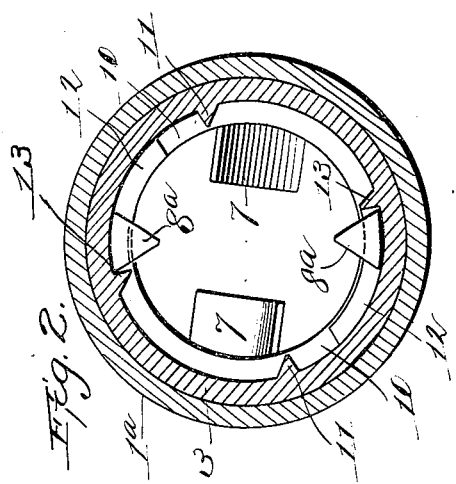

ANTHONY HEIMERMAN, OF SYRACUSE, NEW YORK.

HOSE-COUPLING.

1,054,842.

Specification of Letters Patent.

Patented Mar. 4, 1913.

Application filed August 14, 1912. Serial No. 715,032.

*To all whom it may concern:*

Be it known that I, ANTHONY HEIMERMAN, a citizen of the United States, residing at Syracuse, in the county of Onondaga and State of New York, have invented a new and useful Improvement in Hose-Couplings, of which the following is a specification.

This invention relates to a hose coupling in which the locking of the coupling members is completed by pressure of the water passing through the coupling members, and in which such pressure holds the parts in locked position as long as such pressure continues, the members being released and readily detachable when the water is cut off.

With this object in view the invention consists in the novel features of construction hereinafter described, pointed out in the claims and shown in the accompanying drawings in which:—

Figure 1 is a longitudinal section showing coupling members at opposite ends of the hose, intermediate portions of the hose being cut out, the coupling members being shown in interlocked position. Fig. 2 is an enlarged section on the line 2—2 of Fig. 1. Fig. 3 is a similar section on the line 3—3 of Fig. 1.

In the drawings 1 and 2 represent respectively coupling members at opposite ends of the hose, the member 1 being adapted to be connected to a plug, engine or other source of water supply, and the member 2 being reduced to form a discharge nozzle. Intermediate members 3 and 4 coöperate respectively with the members 1 and 2. So far as the locking mechanism is concerned the coupling member 1 corresponds with the member 4, and the member 2 with the member 3. A detail description therefore of the coöperating members 1 and 3 will give a clear idea of the construction of all the coupling members which might be employed, as the number of these would of course depend upon the length of the pipe and the number of sections of hose coupled together to complete the pipe.

5 indicates the usual hose secured to the members 3 and 4 in the usual manner.

Coupling member 1 is threaded as shown at 6 to adapt it to be connected to a suitable source of water supply and at the end opposite the threaded portion is enlarged in diameter as shown at 1ª. The member 1 is provided with two inwardly extending blades 7, set oblique to the longitudinal axis of the coupling member, said blades being arranged opposite each other and being also arranged on intersecting lines. Similar blades 9 are carried by the section 3, but are arranged just the opposite of the blades 7, so that when the water under high pressure strikes the blades 7 and tends to turn or rotate the member 1 in one direction it will also strike the blades 9 and tend to turn or rotate the member 3 in the opposite direction. In order that this turning movement imparted to the members by the pressure of the water may cause them to interlock I provide the member 1 with locking lugs 8 which are carried by the body portion of the coupling and extend longitudinally into the enlarged portion, thereby being spaced from the sides of the coupling member. These lugs, of which there are two, placed opposite each other, are provided at their free ends with inwardly turned T-heads 8ª. The member 3 is also slightly enlarged at its meeting end and is provided with an angled slide or guide way 10 formed by parallel angled ribs 11 and 12, the inner end of the guideway being closed by a cross rib 13. The rib 12 has a portion of its inner face slightly cut away to form a shoulder 14. The guideway thus described is duplicated on opposite sides of the member 3, one guideway being formed for each lug 8. The member 4 is also provided with blades 7 and lugs 8 and the member 2 with blades 9 and guideways 10.

In use the coupling members are presented to each other so that the heads of the lugs 8 will enter the guideways 10, as soon as the water pressure is turned on it will act on the two sets of blades 7 and 9 and the T-heads 8ª will slide to the inner ends of the guideways and drop behind the shoulders 14. When the water is cut off and the blades 7 and 9 are relieved of pressure the heads can be disengaged from the said shoulders and the coupling readily turned to enable the heads 8ª to be withdrawn from the guideways.

What I claim is:

1. The combination with coacting coupling members, of blades arranged in sets in said coupling members, the blades of each set being oppositely disposed, and one set being oppositely arranged with respect to the other.

2. The combination with coupling members adapted to interlock, of oppositely disposed blades arranged in said members and adapted to be acted upon by pressure of water passing through the members, thereby locking said members together.

3. The combination with co-acting coupling members, of angled guideways carried by one member, said guideways having shoulders therein, lugs having T-heads carried by the other member, said heads being adapted to enter said guideways and fall behind said shoulders, and oppositely disposed blades carried by said members, said blades being acted on by water pressure for the purpose of carrying said heads along said guideways and holding them behind said shoulders, the lugs being contained entirely with the coupling member to which they are connected.

ANTHONY HEIMERMAN.

Witnesses:
ARTHUR FLUM,
F. O. DRESSLER.